United States Patent
Liu et al.

(10) Patent No.: US 9,111,550 B1
(45) Date of Patent: Aug. 18, 2015

(54) WRITE TRANSDUCER HAVING A MAGNETIC BUFFER LAYER SPACED BETWEEN A SIDE SHIELD AND A WRITE POLE BY NON-MAGNETIC LAYERS

(71) Applicant: Western Digital (Fremont), LLC, Fremont, CA (US)

(72) Inventors: Feng Liu, San Ramon, CA (US); Zhanjie Li, Pleasanton, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 14/560,212

(22) Filed: Dec. 4, 2014

(51) Int. Cl.
*G11B 5/11* (2006.01)

(52) U.S. Cl.
CPC .................................. *G11B 5/11* (2013.01)

(58) Field of Classification Search
USPC ........................................................ 360/125.3
See application file for complete search history.

(56) References Cited

U.S. PATENT DOCUMENTS

| | | | |
|---|---|---|---|
| 6,016,290 A | 1/2000 | Chen et al. | |
| 6,018,441 A | 1/2000 | Wu et al. | |
| 6,025,978 A | 2/2000 | Hoshi et al. | |
| 6,025,988 A | 2/2000 | Yan | |
| 6,032,353 A | 3/2000 | Hiner et al. | |
| 6,033,532 A | 3/2000 | Minami | |
| 6,034,851 A | 3/2000 | Zarouri et al. | |
| 6,043,959 A | 3/2000 | Crue et al. | |
| 6,046,885 A | 4/2000 | Aimonetti et al. | |
| 6,049,650 A | 4/2000 | Jerman et al. | |
| 6,055,138 A | 4/2000 | Shi | |
| 6,058,094 A | 5/2000 | Davis et al. | |
| 6,073,338 A | 6/2000 | Liu et al. | |
| 6,078,479 A | 6/2000 | Nepela et al. | |
| 6,081,499 A | 6/2000 | Berger et al. | |
| 6,094,803 A | 8/2000 | Carlson et al. | |
| 6,099,362 A | 8/2000 | Viches et al. | |
| 6,103,073 A | 8/2000 | Thayamballi | |
| 6,108,166 A | 8/2000 | Lederman | |
| 6,118,629 A | 9/2000 | Huai et al. | |
| 6,118,638 A | 9/2000 | Knapp et al. | |
| 6,125,018 A | 9/2000 | Takagishi et al. | |
| 6,130,779 A | 10/2000 | Carlson et al. | |
| 6,134,089 A | 10/2000 | Barr et al. | |
| 6,136,166 A | 10/2000 | Shen et al. | |
| 6,137,661 A | 10/2000 | Shi et al. | |
| 6,137,662 A | 10/2000 | Huai et al. | |
| 6,160,684 A | 12/2000 | Heist et al. | |
| 6,163,426 A | 12/2000 | Nepela et al. | |
| 6,166,891 A | 12/2000 | Lederman et al. | |
| 6,173,486 B1 | 1/2001 | Hsiao et al. | |
| 6,175,476 B1 | 1/2001 | Huai et al. | |

(Continued)

*Primary Examiner* — Wayne Young
*Assistant Examiner* — Carlos E Garcia (57) ABSTRACT

A write transducer for a disk drive magnetic head includes a ferromagnetic write yoke having a write pole protruding towards an air bearing surface. The write transducer also includes a ferromagnetic side shield, and a ferromagnetic buffer layer disposed between the write yoke and the side shield. A first non-magnetic layer is disposed between the side shield and the ferromagnetic buffer layer. A second non-magnetic layer is disposed between the ferromagnetic buffer layer and the write yoke. The ferromagnetic buffer layer extends in a direction normal to the air bearing surface by a buffer layer throat height in the range of 10 nm to 500 nm. In certain embodiments, such a write transducer may advantageously reduce undesired wide area track erasure, without unacceptably degrading write field rise time for acceptable on-track writing data rate.

24 Claims, 7 Drawing Sheets

(56) References Cited

U.S. PATENT DOCUMENTS

| | | |
|---|---|---|
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,562,487 B1 | 5/2003 | Vas'ko et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |

(56) References Cited

U.S. PATENT DOCUMENTS

| | | |
|---|---|---|
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Sin et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,177,117 B1 | 2/2007 | Jiang et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et al. |
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,263,762 B2 | 9/2007 | Bedell et al. |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,371,152 B1 | 5/2008 | Newman |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,417,832 B1 | 8/2008 | Erickson et al. |
| 7,419,891 B1 | 9/2008 | Chen et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,443,632 B1 | 10/2008 | Stoev et al. |
| 7,444,740 B1 | 11/2008 | Chung et al. |
| 7,493,688 B1 | 2/2009 | Wang et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,583,466 B2 | 9/2009 | Kermiche et al. |
| 7,595,967 B1 | 9/2009 | Moon et al. |
| 7,639,457 B1 | 12/2009 | Chen et al. |
| 7,660,080 B1 | 2/2010 | Liu et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |

(56) References Cited

U.S. PATENT DOCUMENTS

| | | |
|---|---|---|
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,872,835 B2 | 1/2011 | Guan |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,920,359 B2 | 4/2011 | Maruyama et al. |
| 7,968,219 B1 | 6/2011 | Jiang et al. |
| 7,978,431 B2 | 7/2011 | Han et al. |
| 7,979,978 B2 | 7/2011 | Han et al. |
| 7,982,989 B1 | 7/2011 | Shi et al. |
| 7,983,001 B2 | 7/2011 | Sato et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,174,790 B2 | 5/2012 | Sasaki et al. |
| 8,179,636 B1 | 5/2012 | Bai et al. |
| 8,189,295 B2 | 5/2012 | Han et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,243,387 B2 | 8/2012 | Yamaguchi et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,400,733 B2 | 3/2013 | Shin et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |

(56) References Cited

U.S. PATENT DOCUMENTS

| | | |
|---|---|---|
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,470,186 B2 | 6/2013 | Chen et al. |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |
| 8,780,498 B1 | 7/2014 | Jiang et al. |
| 8,780,505 B1 | 7/2014 | Xiao |
| 8,786,983 B1 | 7/2014 | Liu et al. |
| 8,790,524 B1 | 7/2014 | Luo et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 8,813,324 B2 | 8/2014 | Emley et al. |
| 8,848,316 B2 * | 9/2014 | Kief et al. .................. 360/125.3 |
| 2007/0268626 A1 * | 11/2007 | Taguchi et al. ................ 360/126 |
| 2008/0273276 A1 | 11/2008 | Guan |
| 2009/0154019 A1 * | 6/2009 | Hsiao et al. ................. 360/234.3 |
| 2010/0033879 A1 * | 2/2010 | Ota et al. ....................... 360/319 |
| 2010/0290157 A1 | 11/2010 | Zhang et al. |
| 2011/0086240 A1 | 4/2011 | Xiang et al. |
| 2012/0111826 A1 | 5/2012 | Chen et al. |
| 2012/0216378 A1 | 8/2012 | Emley et al. |
| 2012/0237878 A1 | 9/2012 | Zeng et al. |
| 2012/0298621 A1 | 11/2012 | Gao |
| 2013/0216702 A1 | 8/2013 | Kaiser et al. |
| 2013/0216863 A1 | 8/2013 | Li et al. |
| 2013/0242431 A1 * | 9/2013 | Hosomi et al. ........... 360/119.02 |
| 2013/0257421 A1 | 10/2013 | Shang et al. |
| 2014/0063657 A1 | 3/2014 | Gao et al. |
| 2014/0154529 A1 | 6/2014 | Yang et al. |
| 2014/0175050 A1 | 6/2014 | Zhang et al. |

* cited by examiner

WRITE TRANSDUCER HAVING A MAGNETIC BUFFER LAYER SPACED BETWEEN A SIDE SHIELD AND A WRITE POLE BY NON-MAGNETIC LAYERS

BACKGROUND

Information storage devices are used to retrieve and/or store data in computers and other consumer electronics devices. A magnetic hard disk drive is an example of an information storage device that includes one or more magnetic heads that can both read and write, but other information storage devices also include heads—sometimes including heads that cannot write.

In a magnetic hard disk drive, the head typically comprises a body called a "slider" that carries a magnetic transducer on its trailing end. The magnetic transducer typically comprises a writer and a read element. The magnetic transducer's writer may be of a longitudinal or perpendicular design, and the read element of the magnetic transducer may be inductive or magnetoresistive. In a magnetic hard disk drive, the transducer is typically supported in very close proximity to a spinning magnetic disk by a hydrodynamic air bearing. As a motor rotates the magnetic disk, the hydrodynamic air bearing is formed between an air bearing surface of the slider of the head and a surface of the magnetic disk. The thickness of the air bearing at the location of the transducer is commonly referred to as the "mechanical flying height."

The magnetic disk typically includes several layers near its surface. Information is stored magnetically in a hard magnetic layer. A protective layer including carbon typically covers the hard magnetic layer for wear and corrosion resistance. The hard magnetic layer is typically supported by one or more underlayers with desired surface and/or properties. For example, in perpendicular recording applications, a magnetically soft underlayer may help channel magnetic flux beneath the hard magnetic layer. The magnetic transducer of the head and the hard magnetic layer of the disk are typically separated by both the air bearing and the disk protective layer(s). This separation is typically referred to as the "magnetic head-disk spacing," the "magnetic spacing," or the "magnetic flying height."

Modern magnetic transducers may include a magnetic shield to shunt write fields in the off track direction, thus facilitating high track density magnetic recording. However, the presence of the side shields may worsen wide area track erasure ("WATER") due to excessive off track write field and interactions with the domain walls of the side shield. To reduce WATER and reduce off track writing, a side shield having a longer throat height is preferred. However, to reduce write field rise time and increase data rate for writing on track, a side shield having a shorter throat height is preferred.

Accordingly, what is needed in the art is a shielded write transducer design that improves the engineering trade-off between off-track and on-track writing performance.

DETAILED DESCRIPTION OF EXAMPLE EMBODIMENTS

Figure 1:
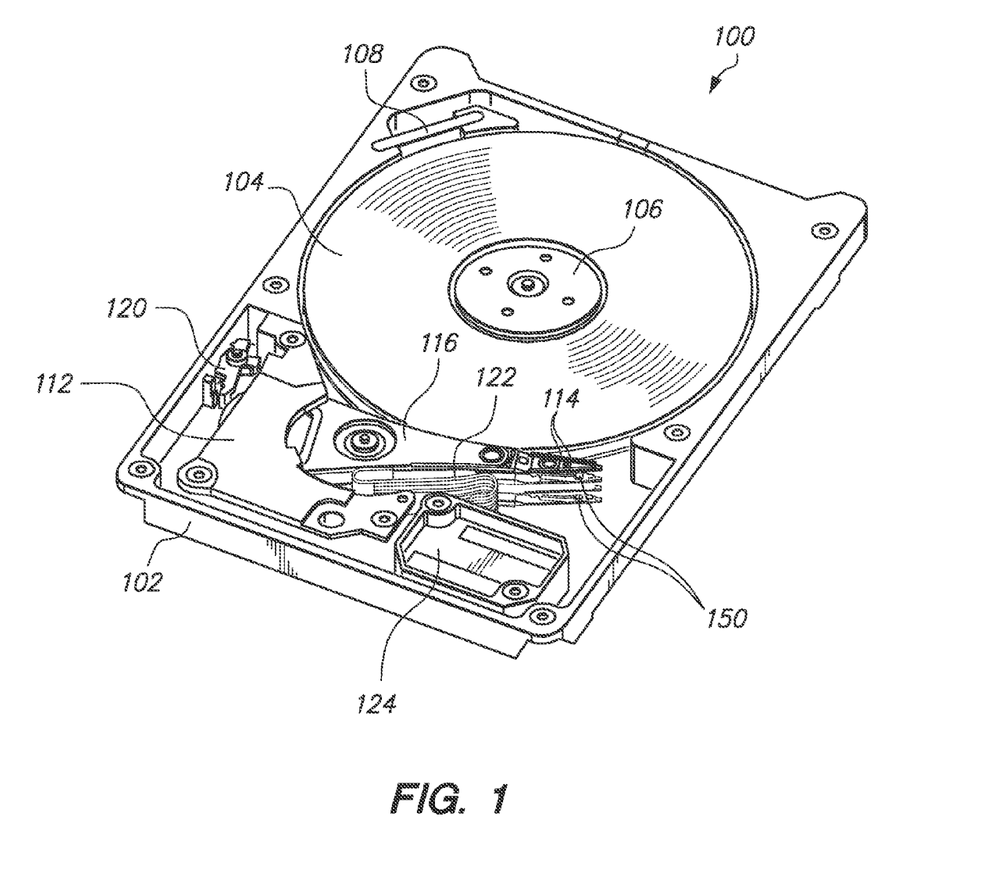
FIG. 1 is a top perspective view of a disk drive information storage device that is capable of including an embodiment of the present invention, with the top cover removed to reveal internal components.

FIG. 1 is a top perspective view of a disk drive 100 that is capable of including an embodiment of the present invention, with the top cover removed to reveal internal components. The disk drive 100 includes a disk drive base 102 and two annular magnetic disks 104. The disk drive 100 further includes a spindle 106, rotatably mounted on the disk drive base 102, for rotating the disks 104. The rotation of the disks 104 establishes air flow through recirculation filter 108. In other embodiments, disk drive 100 may have only a single disk, or alternatively, more than two disks.

The disk drive 100 further includes an actuator 116 that is pivotably mounted on disk drive base 102. Voice coil motor 112 pivots the actuator 116 through a limited angular range so that at least one head gimbal assembly (HGA) 114 is desirably positioned relative to one or more tracks of information on a corresponding one of the disks 104. In the embodiment of FIG. 1, the actuator 116 includes three arms upon which four HGAs 114 are attached, each corresponding to a surface of one of the two disks 104. However in other embodiments fewer or more HGAs 114 may be included depending on the number of disks 104 that are included and whether the disk drive 100 is depopulated.

Each HGA 114 preferably includes a head 150 for reading and writing from/to one of the disks 104. The head 150 may perform various functions and contain various microscopic structures such as a read transducer for reading data, a write transducer for writing data, a microactuator, a heater, a laser, a lapping guide, etc. The actuator 116 may occasionally be latched at an extreme angular position within the limited angular range, by latch 120. Electrical signals to/from the HGAs 114 are carried to other drive electronics via a flexible printed circuit (FPC) that includes a flex cable 122 (preferably including a preamplifier circuit) and flex cable bracket 124.

Figure 2:
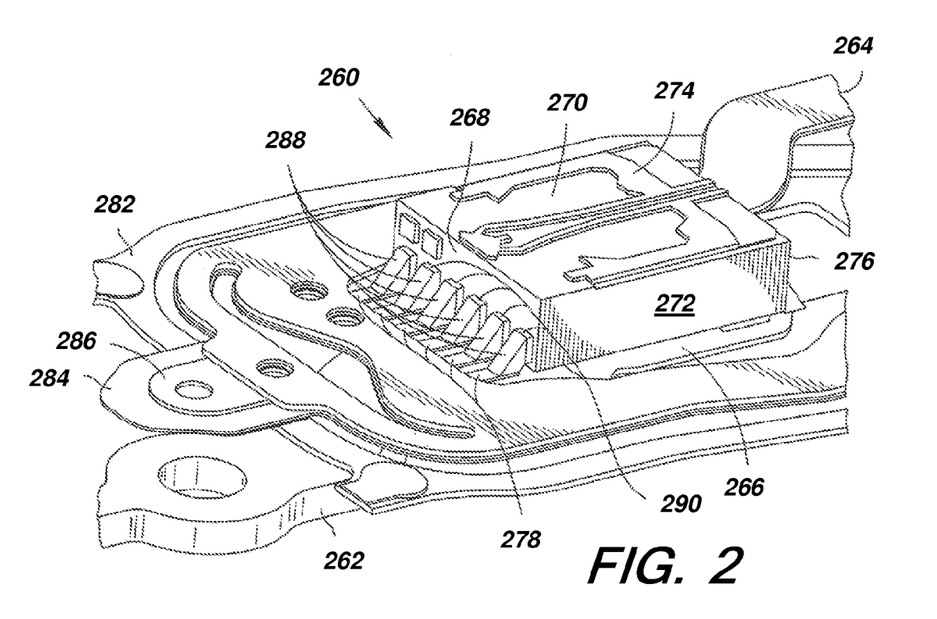
FIG. 2 depicts a distal end of a head gimbal assembly that includes a head that is capable of including an embodiment of the present invention.

FIG. 2 depicts the distal end of a head gimbal assembly (HGA) 260 that includes a head 270 that is capable of including an embodiment of the present invention. In FIG. 2, the HGA 260 includes load beam 262 and a head 270. The head 270 includes a slider substrate 272 having a trailing face 268 and a leading face 276 opposite the trailing face 268. The slider substrate 272 preferably comprises AlTiC or silicon. The slider substrate 272 also includes an air bearing surface 274 that is substantially orthogonal to the trailing face 268. The head 270 includes a read/write transducer (too small to be practically shown in the view of FIG. 2, but disposed on the trailing face 268). In certain embodiments, the read/write transducer is preferably an inductive magnetic write transducer merged with a magneto-resistive read transducer. The purpose of the load beam 262 is to provide vertical compliance for the head 270 to follow vertical undulations of the surface of a disk (e.g. disk 104 of FIG. 1) as it rotates, and to preload the air bearing surface 274 of the head 270 against the disk surface by a preload force that is commonly referred to as the "gram load."

The HGA 260 also includes a laminated flexure 264 attached to the load beam 262. The read head 270 is attached to a tongue 266 of the laminated flexure 264. A first purpose of the laminated flexure 264 is to provide compliance for the read head 270 to follow pitch and roll angular undulations of the surface of the disk (e.g. disk 104) as it rotates, while restricting relative motion between the read head 270 and the load beam 262 in the lateral direction and about a yaw axis. A second purpose of the laminated flexure 264 is to provide a plurality of electrical paths to facilitate signal transmission to/from the read head 270.

For that second purpose, the laminated flexure 264 includes a plurality of electrically conductive traces 278 that are defined in an electrically conductive layer 286, and that are isolated from a supporting structural layer 282 by a dielectric layer 284 that is disposed between the structural layer 282 and the electrically conductive layer 286. The plurality of electrically conductive traces 278 of the flexure 264 may be electrically connected to a first plurality of electrically conductive trailing connection pads 290 on the trailing face 268 of the read head 270, by a plurality of 90° bonds 288.

In the example of FIG. 2, the first plurality of electrically conductive trailing connection pads 290 may optionally comprise copper or gold, and the plurality of 90° bonds 288 preferably comprises solder or gold. The conductive layer 286 and the conductive traces 278 may comprise copper, the structural layer 282 may comprise stainless steel and/or another suitable structural material, and the dielectric layer 284 may comprise polyimide, for example. In various regions of the laminated flexure 264, one or more of the layers may be absent (e.g. removed by etching).

Figure 3:
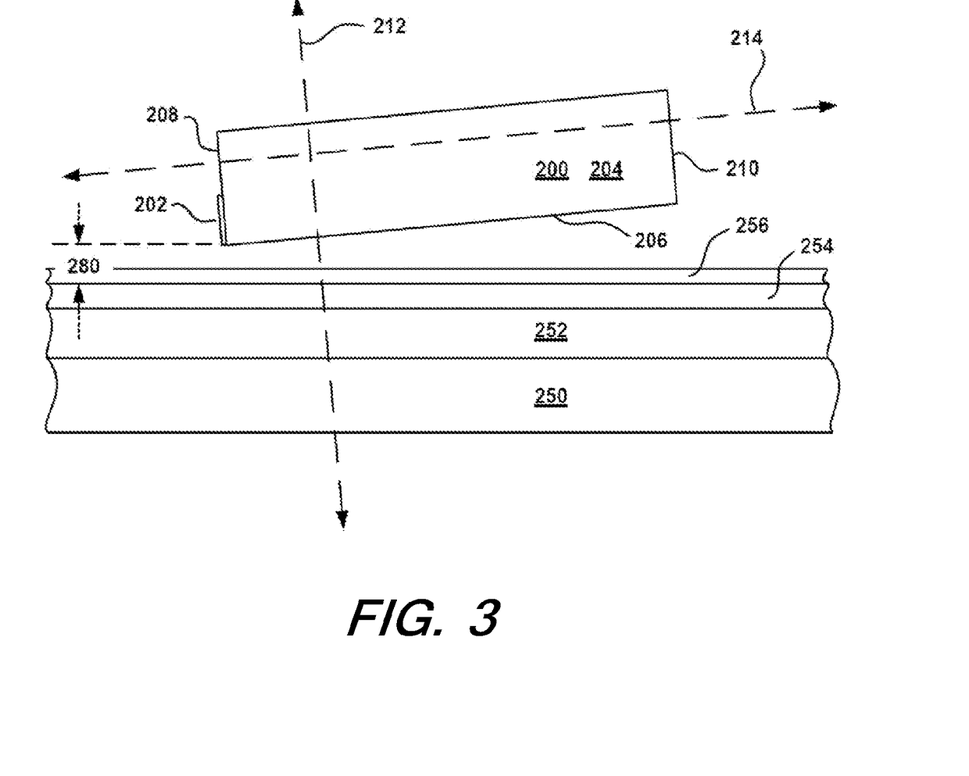
FIG. 3 is a schematic illustration (not to scale) of a magnetic head "flying" over a magnetic disk, with disk layer thicknesses, slider flying height, and slider pitch angle, all greatly exaggerated so that those microscopic quantities can be discernable in the illustration.

FIG. 3 is a schematic illustration (not to scale) of a magnetic head 200 "flying" over a magnetic disk 250, with disk layer thicknesses, slider flying height, and slider pitch angle, all greatly exaggerated so that those microscopic quantities can be discernable in the illustration. Now referring to FIG. 3, head 200 comprises a transducer 202 for at least writing information to a hard magnetic layer 254 of the disk 250. The transducer 202 is capable of including one or more magnetic shielding structures according to an embodiment of the present invention.

In certain embodiments, the transducer 202 is a merged thin film magnetic transducer comprising an inductive writer and magneto resistive read element. In such embodiments, the magneto resistive element may be a giant magneto resistive element (GMR) or tunneling magneto resistive element (TMR). In such embodiments, the writer may be a perpendicular magnetic recording (PMR) writer, and in such cases the disk will preferably include a soft magnetic underlayer 252 beneath the hard magnetic layer 254.

Head 200 also comprises a slider 204, which may be fabricated from a ceramic material such as alumina titanium carbide. Slider 204 includes an air bearing surface (ABS) 206, which may be formed by etching or ion milling according to dimensions that may be defined by use of a mask. The slider 204 defines a longitudinal axis 214 normal to the trailing face 208, defines a write pole axis 212 normal to the ABS 206, and defines a lateral axis (in and out of the page in FIG. 2) that is normal to both the longitudinal axis 214 and the write pole axis 212.

Note that in FIG. 3 the thicknesses of a protective layer 256 on the disk, the hard magnetic layer 254, and the soft magnetic underlayer 252, have been exaggerated to be discernable in the illustration. Also, a magnetic spacing 280 (between the head transducer 202 and the hard magnetic layer 254 of the disk) has been greatly exaggerated in FIG. 2 so that the slider flying height and the slider pitch angle can be discerned in the illustration. However, during operation of a practical disk drive, the slider flying height and slider pitch angle would both be very small quantities such that the plane of the ABS 206 and the longitudinal axis 214 would both be substantially parallel to the hard magnetic layer 254, and such that both the trailing face 208 and the write pole axis 212 would be substantially normal to the hard magnetic layer 254.

Figure 4:
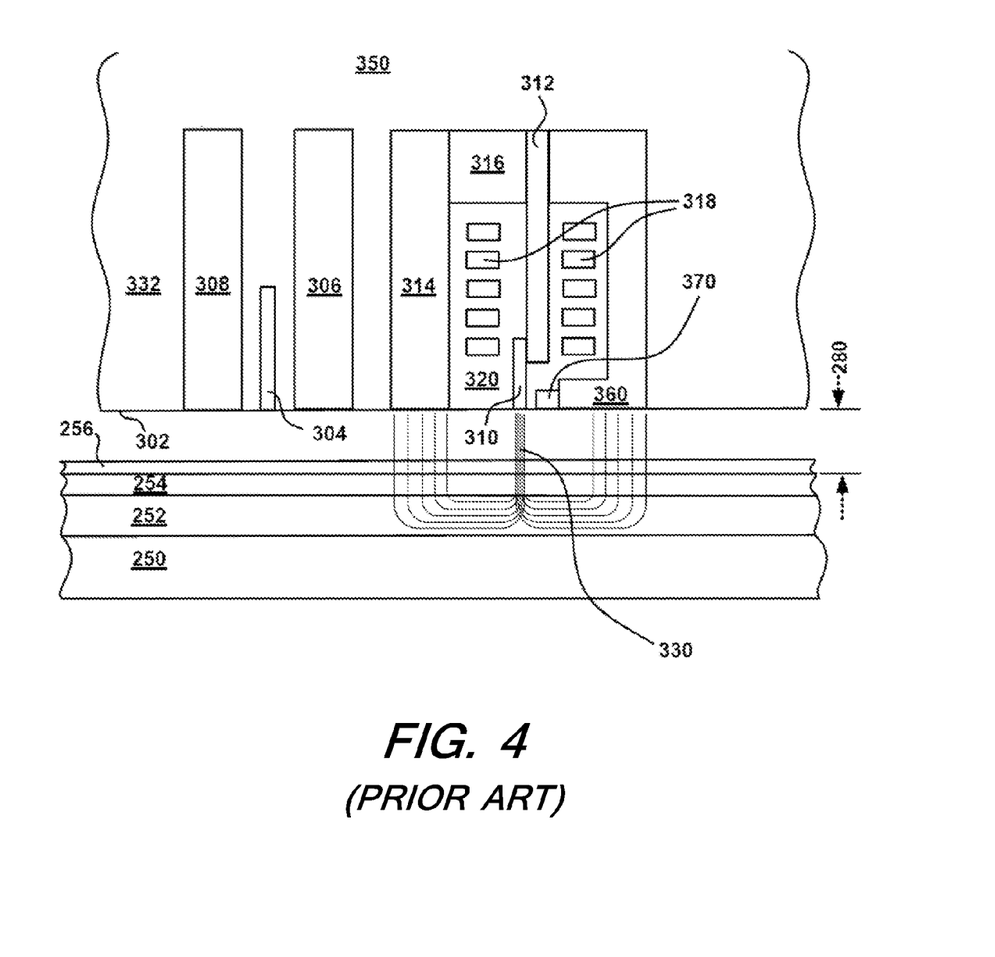
FIG. 4 is a side cross-sectional schematic illustration (not necessarily to scale) of a shielded pole magnetic head transducer in operation over a magnetic disk, according to the prior art, with disk layer thicknesses and slider flying height greatly exaggerated so as to be discernable in the illustration.

FIG. 4 is a side cross-sectional schematic illustration (not necessarily to scale) of a shielded pole magnetic head transducer 350 in operation over a magnetic disk 250, according to the prior art, with disk layer thicknesses and slider flying height greatly exaggerated so as to be discernable in the illustration. The transducer 350 of FIG. 4 includes a perpendicular recording writer that includes conductive coil turns 318, a main pole 310, and two return poles 314 and 360. The main pole 310 has a relatively small cross section near the ABS and is constructed of a soft ferromagnetic material having high magnetic moment, such as FeNi or CoFe (e.g. $Co_{30}Fe_{70}$). The two return poles 314 and 360 are also constructed of a high-permeability soft ferromagnetic material, and have a cross section near the ABS plane 302 that is significantly larger than that of the main pole 310.

Consequently, the magnetic flux 330 that passes between the main pole 310 and the soft magnetic under layer 252 (and through the air bearing and protective layer 256), when a write current is passed through coil turns 318, has a high enough flux density to flip magnetic domains in the hard magnetic layer 254. However, the magnetic flux that passes between the soft magnetic underlayer 252 and the two return poles 314 and 360 have too low a flux density to flip magnetic domains in the hard magnetic layer 254. A closed high-permeability path for the magnetic flux is completed by back gap 316 and yoke piece 312 which are also constructed of a soft ferromagnetic material.

In the example of FIG. 4, the read sensor 304 may be a current perpendicular to plane (CPP) giant magnetoresistive (GMR) sensor, a current in plane (CIP) GMR sensor, or a tunnel junction sensor (TMR), etc. The read sensor 304 is located between and insulated from first and second reader magnetic shields 306, 308. The reader magnetic shields 306, 308, which comprise a soft magnetic material such as CoFe or NiFe, have high enough permeability to channel undesired magnetic fields (e.g. stray fields and/or fields from nearby data tracks) away from the read sensor 304, so that the read sensor 304 predominantly detects only the desired data track located between the reader shields 306, 308.

In the example of FIG. 4, conductive coil turns 318 are surrounded by an electrically insulating material 320 that electrically insulates them from one another and from the surrounding magnetic yoke structures (e.g. return poles 314, 360, main pole 310, back gap 316, and yoke piece 312). The regions surrounding the read element 304 and reader shields 306, 308 also may comprise a non-ferromagnetic and electrically insulating material 332 (e.g. alumina).

In the example of FIG. 4, the tip of the main pole 310 terminates in the ABS plane 302 so that the magnetic spacing 280 is equal to the flying height plus the thickness of disk protective layer 256. However in certain other examples the transducer 350 may be marginally recessed from the plane of the ABS due to lapping. For example, the transducer 350 may be recessed from the ABS plane 302 by approximately 2.5 nanometers due to lapping (thereby increasing the magnetic spacing 280 by approximately 2.5 nanometers). The transducer 350 may also slightly protrude beyond the ABS plane due to thermal expansion (e.g. thermal pole tip protrusion and/or thermal dynamic transducer actuation), thereby reducing the magnetic spacing 280 by the amount of protrusion.

In the example of FIG. 4, the return pole 360 may also function as a leading or trailing writer shield, and its function in that regard may be enhanced by the optional addition of an S3 shield 370 which may extend longitudinally from the second return pole 360 towards the main pole 310.

Figure 5:
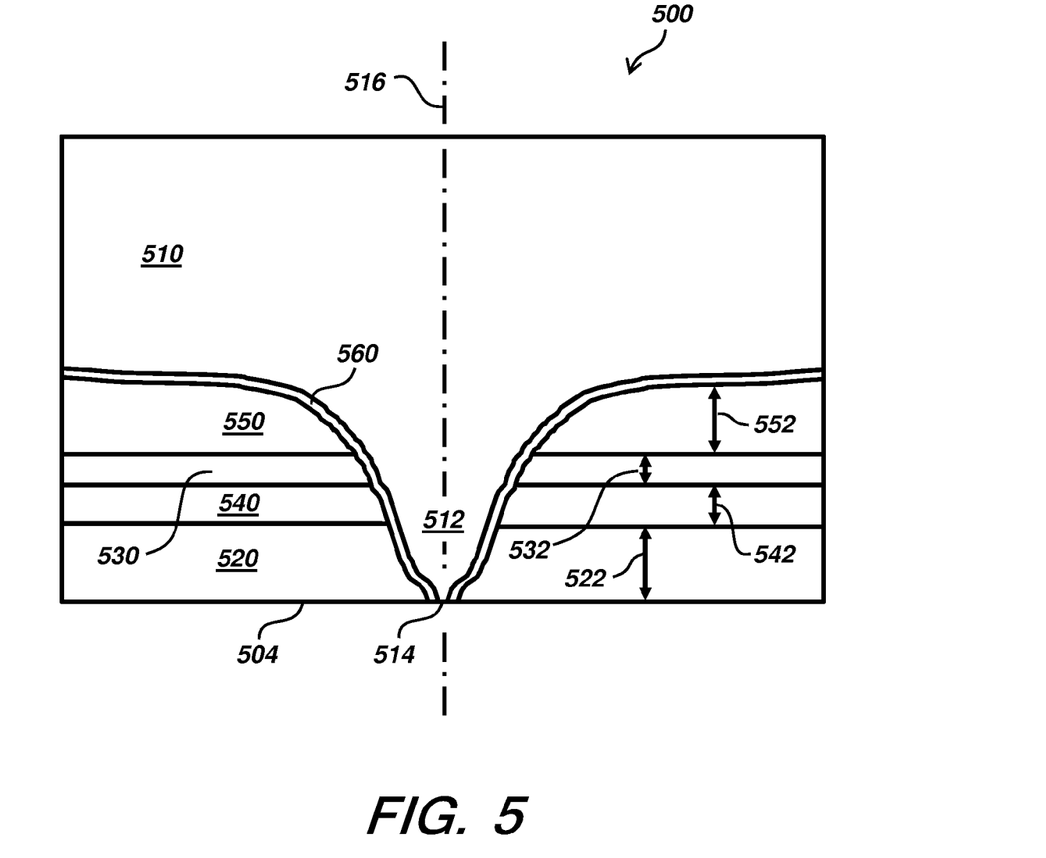
FIG. 5 is a rear cross-sectional view of a write transducer according to an embodiment of the present invention.
Figure 6:
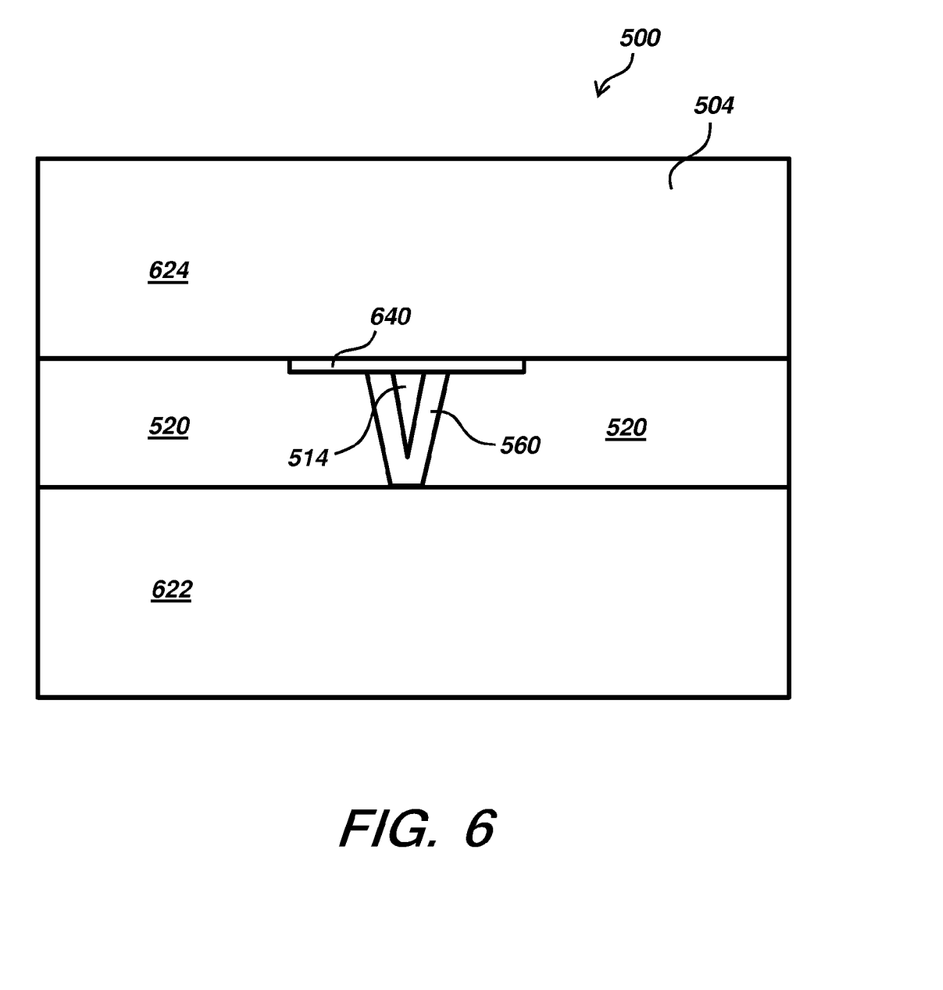
FIG. 6 is an air bearing surface view of a write transducer capable of including an embodiment of the present invention.

FIG. 5 is a rear cross-sectional view of a write transducer 500 according to certain embodiments of the present invention. FIG. 6 is an air bearing surface view of the write transducer 500. Now referring to FIGS. 5 and 6, the write transducer 500 includes a write yoke 510 comprising a first ferromagnetic material (e.g. $Co_{30}Fe_{70}$ or other high-permeability ferromagnetic composition). A write pole 512 protrudes from the write yoke 510 towards an air bearing surface 504 of the write transducer 500, and terminates at a pole tip 514 (adjacent to the air bearing surface 504) that may optionally have a roughly triangular, rectangular, or trapezoidal cross sectional shape in a plane parallel to the air bearing surface 504. In certain embodiments, the write pole 512 may protrude from the write yoke 510 along a write pole axis 516 that is optionally normal to the air bearing surface 504.

In the embodiment of FIGS. 5 and 6, the write transducer 500 includes a side shield 520 comprising a second ferromagnetic material (e.g. $Ni_{30}Fe_{70}$, $Co_{69}Ni_{14}Fe_{17}$, $Co_{50}Ni_{15}Fe_{35}$, or other high-permeability ferromagnetic composition). The side shield 520 may span a side shield throat height 522 that is optionally in the range of 50 nm to 600 nm, as measured in a direction normal to the air bearing surface 504.

In the embodiment of FIGS. 5 and 6, the pole tip 514 may be separated from the side shield 520 by a side gap comprising a non-magnetic metal layer 560 having a thickness in the range of 10 nm to 100 nm. In certain embodiments, the non-magnetic metal layer 560 of the side gap optionally may comprise ruthenium, tantalum, or copper.

In the embodiment of FIGS. 5 and 6, the write transducer 500 includes a ferromagnetic buffer layer 530 disposed between the write yoke 510 and the side shield 520. The ferromagnetic buffer layer 530 preferably extends in a direction normal to the air bearing surface 504 by a buffer layer throat height 532 in the range of 10 nm to 500 nm. The ferromagnetic buffer layer may comprise a third ferromagnetic material that preferably has a magnetic moment of no less than 1.6 Tesla. In certain embodiments, the third ferromagnetic material of the buffer layer 530 optionally may have a magnetic moment that is 0.6 to two times that of the second ferromagnetic material of the side shield 520. In certain embodiments, the third ferromagnetic material of the buffer layer 530 optionally may have the same composition as the second ferromagnetic material of the side shield 520.

In the embodiment of FIGS. 5 and 6, the write transducer 500 includes a first non-magnetic layer 540 disposed between the side shield 520 and the ferromagnetic buffer layer 530. Hence, the ferromagnetic buffer layer 530 is spaced from the side shield 520 by no less than a thickness 542 of the first non-magnetic layer 540. The thickness 542 of the first non-magnetic layer 540 optionally may be in the range of 10 nm to 300 nm, as measured in a direction normal to the air bearing surface 504.

In the embodiment of FIGS. 5 and 6, the write transducer 500 includes a second non-magnetic layer 550 disposed between the ferromagnetic buffer layer 530 and the write yoke 510. Hence, the ferromagnetic buffer layer 530 is spaced from the write yoke 510 by no less than a thickness 552 of the second non-magnetic layer 550. The thickness 552 of the second non-magnetic layer 550 optionally may be in the range of 100 nm to 1 μm, as measured in a direction normal to the air bearing surface 504. In certain embodiments, each of the first and second non-magnetic layers 540, 550 may optionally comprise a ceramic material such as aluminum oxide, titanium oxide, or magnesium oxide.

In certain embodiments, the write transducer 500 may include a ferromagnetic wrap-around shield structure that includes the side shield 520. Such a ferromagnetic wrap-around shield structure may surround the write pole 512 in a plane parallel to the air bearing surface 504. For example, as shown in FIG. 6, a wrap-around shield structure may include the side shield 520, a leading shield 622, and a trailing shield 624, essentially surrounding the writer pole tip 514. The leading shield 622 and the trailing shield 624 each comprises a high-permeability ferromagnetic material, for example, optionally the same as that of the side shield 520. FIG. 6 also depicts a conventional trailing gap 640.

The write transducer 500 described with reference to FIGS. 5 and 6 may advantageously enable the side shield 520 to have a longer throat height 522 in certain embodiments, without excessively increasing write field rise time or excessively degrading data rate for writing on track. Hence, the write transducer 500 of FIGS. 5 and 6 may advantageously shunt write fields in the off track direction, and avoid wide area track erasure ("WATER") that might otherwise be caused by excessive off track write field and interactions with the domain walls of the side shield 520. In this way, the design of the write transducer 500 may improve the engineering trade-off between off-track and on-track writing performance.

In certain embodiments, the ferromagnetic buffer layer 530 may be just one of a plurality of ferromagnetic buffer layers disposed between the write yoke 510 and the side shield 520, each separated from another by a non-magnetic decoupling layer. For example, FIG. 7 is a rear cross-sectional view of a write transducer 700 according to one such embodiment of the present invention.

Figure 7:
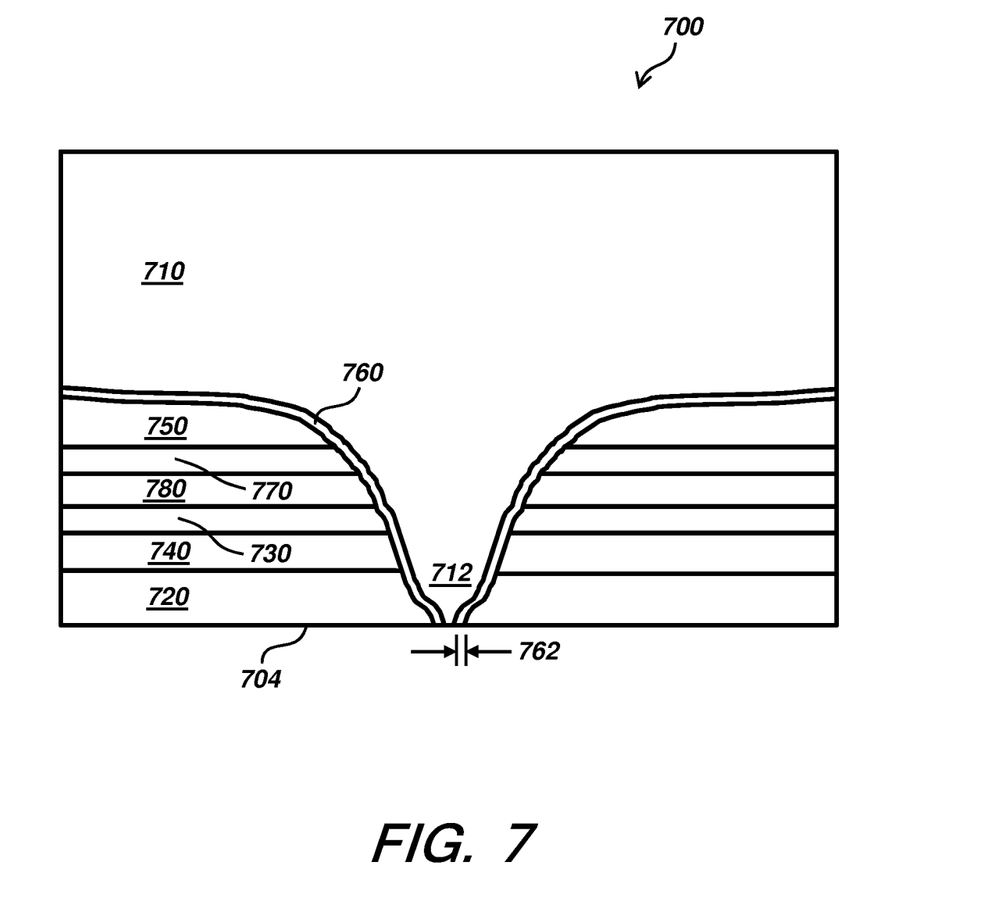
FIG. 7 is a rear cross-sectional view of a write transducer according to another embodiment of the present invention.

In the embodiment of FIG. 7, the write transducer 700 includes a high-permeability ferromagnetic write yoke 710 and a write pole 712 protruding from the write yoke 710 towards an air bearing surface 704 of the write transducer 700. The write transducer 700 includes a high-permeability ferromagnetic side shield 720 that may be separated from the pole tip 712 by a side gap comprising a non-magnetic metal layer 760 having a thickness 762 in the range of 10 nm to 100 nm. In certain embodiments, the non-magnetic metal layer 760 of the side gap optionally may comprise ruthenium, tantalum, or copper.

In the embodiment of FIG. 7, the write transducer 700 includes two or more high-permeability ferromagnetic buffer layers 730 and 770 disposed between the write yoke 710 and the side shield 720. Each of the ferromagnetic buffer layers 730 and 770 preferably extends in a direction normal to the air bearing surface 704 by a buffer layer throat height in the range of 10 nm to 500 nm. Each of the ferromagnetic buffer layers 730 and 770 may optionally comprise a similar or the same ferromagnetic material composition (e.g. $Ni_{30}Fe_{70}$, $Co_{69}Ni_{14}Fe_{17}$, $Co_{50}Ni_{15}Fe_{35}$, etc.), however, it is also contemplated that one or more of a plurality of ferromagnetic buffer layers may comprise one or more different ferromagnetic material compositions. It is not necessary that they be the same, in certain embodiments.

In the embodiment of FIG. 7, the write transducer 700 includes a first non-magnetic layer 740 disposed between the side shield 720 and the ferromagnetic buffer layer 730. Hence, each of the ferromagnetic buffer layer 730 and 770 is spaced from the side shield 720 by no less than a thickness of the first non-magnetic layer 740. In the embodiment of FIG. 7, the write transducer 700 also includes a second non-magnetic layer 750 disposed between the ferromagnetic buffer layer 770 and the write yoke 710. Hence, each of the ferromagnetic buffer layers 730 and 770 is spaced from the write yoke 710 by no less than a thickness of the second non-magnetic layer 750. In certain embodiments, each of the first and second non-magnetic layers 740, 750 may optionally comprise a ceramic material such as aluminum oxide, titanium oxide, or magnesium oxide.

In the embodiment of FIG. 7, the write transducer 700 also includes a non-magnetic decoupling layer 780 disposed between the ferromagnetic buffer layers 730 and 770. The non-magnetic decoupling layer 780 preferably has a thickness in the range of 10 nm to 300 nm (as measured in a direction normal to the air bearing surface 704), so as to preferably substantially magnetically decouple the ferromagnetic buffer layers 730 and 770.

The write transducer 700 described with reference to FIG. 7 may advantageously enable the side shield 720 to have a longer throat height in certain embodiments, without excessively increasing write field rise time or excessively degrading data rate for writing on track. Hence, the write transducer 700 of FIG. 7 may advantageously shunt write fields in the off track direction, and avoid WATER that might otherwise be caused by excessive off track write field and interactions with the domain walls of the side shield 720. In this way, the design of the write transducer 700 may improve the engineering trade-off between off-track and on-track writing performance.

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. For example, the word "preferably," and the phrase "preferably but not necessarily," are used synonymously herein to consistently include the meaning of "not necessarily" or optionally. "Comprising," "including," and "having," are intended to be open-ended terms.

What is claimed is:

1. A write transducer comprising:
    a write yoke comprising a first ferromagnetic material and including a write pole protruding from the write yoke towards an air bearing surface of the write transducer;
    a side shield comprising a second ferromagnetic material;
    a ferromagnetic buffer layer disposed between the write yoke and the side shield, the ferromagnetic buffer layer comprising a third ferromagnetic material;
    a first non-magnetic layer disposed between the side shield and the ferromagnetic buffer layer, the ferromagnetic buffer layer being spaced from the side shield by no less than a thickness of the first non-magnetic layer; and
    a second non-magnetic layer disposed between the ferromagnetic buffer layer and the write yoke, the ferromagnetic buffer layer being spaced from the write yoke by no less than a thickness of the second non-magnetic layer;
    wherein the ferromagnetic buffer layer extends in a direction normal to the air bearing surface by a buffer layer throat height in the range of 10 nm to 500 nm, and wherein the third ferromagnetic material has a magnetic moment that is 0.6 to two times that of the second ferromagnetic material.

2. The write transducer of claim 1 wherein the write pole protrudes from the write yoke along a write pole axis that is normal to the air bearing surface.

3. The write transducer of claim 1 wherein the thickness of the first non-magnetic layer is in the range of 10 nm to 300 nm, as measured in a direction normal to the air bearing surface.

4. The write transducer of claim 1 wherein the thickness of the second non-magnetic layer is in the range of 100 nm to 1 µm, as measured in a direction normal to the air bearing surface.

5. The write transducer of claim 1 wherein the side shield spans a side shield throat height in the range of 50 nm to 600 nm, as measured in a direction normal to the air bearing surface.

6. The write transducer of claim 1 wherein the write transducer is a perpendicular magnetic recording write transducer, and the first ferromagnetic material has a composition $Co_{30}Fe_{70}$.

7. The write transducer of claim 1 wherein the second ferromagnetic material has a composition selected from the group consisting of $Ni_{30}Fe_{70}$, $Co_{69}Ni_{14}Fe_{17}$, and $Co_{50}Ni_{15}Fe_{35}$.

8. The write transducer of claim 1 wherein the third ferromagnetic material has the same composition as the second ferromagnetic material.

9. The write transducer of claim 1 wherein the third ferromagnetic material has a magnetic moment of no less than 1.6 Tesla.

10. The write transducer of claim 1 wherein each of the first and second non-magnetic layers comprises aluminum oxide, titanium oxide, or magnesium oxide.

11. The write transducer of claim 1 wherein the write pole includes a pole tip disposed adjacent to the air bearing surface, the pole tip being separated from the side shield by a side gap, the side gap comprising a non-magnetic metal layer having a thickness in the range of 10 nm to 100 nm.

12. The write transducer of claim 11 wherein the pole tip has a triangular cross sectional shape in a plane parallel to the air bearing surface, and the non-magnetic metal layer comprises ruthenium, tantalum, or copper.

13. The write transducer of claim 1 further comprising a ferromagnetic wrap-around shield structure that comprises the side shield and the second ferromagnetic material, the ferromagnetic wrap-around shield structure surrounding the write pole in a plane parallel to the air bearing surface.

14. The write transducer of claim 1 wherein the ferromagnetic buffer layer is one of a plurality of ferromagnetic buffer layers disposed between the write yoke and the side shield, each separated from another by a non-magnetic decoupling layer having a thickness in the range of 10 nm to 300 nm, as measured in a direction normal to the air bearing surface.

15. A magnetic head comprising:
    a slider having an air bearing surface and a trailing face approximately orthogonal to the air bearing surface;
    a write transducer disposed on the trailing face, the write transducer comprising
        a write yoke comprising a first ferromagnetic material and including a write pole protruding from the write yoke towards the air bearing surface;
        a side shield comprising a second ferromagnetic material;
        a ferromagnetic buffer layer disposed between the write yoke and the side shield, the ferromagnetic buffer layer comprising a third ferromagnetic material;
        a first non-magnetic layer disposed between the side shield and the ferromagnetic buffer layer, the ferromagnetic buffer layer being spaced from the side shield by no less than a thickness of the first non-magnetic layer; and a second non-magnetic layer disposed between the ferromagnetic buffer layer and the write yoke, the ferromagnetic buffer layer being spaced from the write yoke by no less than a thickness of the second non-magnetic layer;

wherein the ferromagnetic buffer layer extends in a direction normal to the air bearing surface by a buffer layer throat height in the range of 10 nm to 500 nm, and wherein the third ferromagnetic material has a magnetic moment that is 0.6 to two times that of the second ferromagnetic material.

16. The magnetic head of claim 15 wherein the thickness of the first non-magnetic layer is in the range of 10 nm to 300 nm, as measured in a direction normal to the air bearing surface.

17. The magnetic head of claim 15 wherein the thickness of the second non-magnetic layer is in the range of 100 nm to 1 μm, as measured in a direction normal to the air bearing surface.

18. The magnetic head of claim 15 wherein the side shield spans a side shield throat height in the range of 50 nm to 600 nm, as measured in a direction normal to the air bearing surface.

19. The magnetic head of claim 15 wherein the third ferromagnetic material has the same composition as the second ferromagnetic material.

20. The magnetic head of claim 15 wherein the third ferromagnetic material has a magnetic moment of no less than 1.6 Tesla.

21. The magnetic head of claim 15 wherein the write pole includes a pole tip disposed adjacent to the air bearing surface, the pole tip being separated from the side shield by a side gap, the side gap comprising a non-magnetic metal layer having a thickness in the range of 10 nm to 100 nm.

22. The magnetic head of claim 15 further comprising a ferromagnetic wrap-around shield structure that comprises the side shield and the second ferromagnetic material, the ferromagnetic wrap-around shield structure surrounding the write pole in a plane parallel to the air bearing surface.

23. The magnetic head of claim 15 wherein the ferromagnetic buffer layer is one of a plurality of ferromagnetic buffer layers disposed between the write yoke and the side shield, each separated from another by a non-magnetic decoupling layer having a thickness in the range of 10 nm to 300 nm, as measured in a direction normal to the air bearing surface.

24. A disk drive comprising:

a disk drive base;

a spindle attached to the disk drive base and defining a spindle axis of rotation;

a disk rotatably mounted on the spindle;

a head actuator attached to the disk drive base;

a magnetic head attached to the head actuator; the magnetic head comprising a slider having an air bearing surface facing the disk, and a trailing face approximately orthogonal to the air bearing surface;

a write transducer disposed on the trailing face, the write transducer comprising a write yoke comprising a first ferromagnetic material and including a write pole protruding from the write yoke towards the air bearing surface;

a side shield comprising a second ferromagnetic material;

a ferromagnetic buffer layer disposed between the write yoke and the side shield, the ferromagnetic buffer layer comprising a third ferromagnetic material;

a first non-magnetic layer disposed between the side shield and the ferromagnetic buffer layer, the ferromagnetic buffer layer being spaced from the side shield by no less than a thickness of the first non-magnetic layer; and a second non-magnetic layer disposed between the ferromagnetic buffer layer and the write yoke, the ferromagnetic buffer layer being spaced from the write yoke by no less than a thickness of the second non-magnetic layer;

wherein the ferromagnetic buffer layer extends in a direction normal to the air bearing surface by a buffer layer throat height in the range of 10 nm to 500 nm, and wherein the third ferromagnetic material has a magnetic moment that is 0.6 to two times that of the second ferromagnetic material.

* * * * *